US011465071B2

(12) United States Patent
Flores

(10) Patent No.: US 11,465,071 B2
(45) Date of Patent: Oct. 11, 2022

(54) ATMOSPHERIC WATER GENERATING APPARATUS AND SYSTEM FOR PRODUCING WATER FROM MOISTURE-LADEN AIR

(71) Applicant: Robert Jesse Flores, Madera, CA (US)

(72) Inventor: Robert Jesse Flores, Madera, CA (US)

(73) Assignee: DripDropUSA, Inc., Madera, CA (US)

( * ) Notice: Subject to any disclaimer, the term of this patent is extended or adjusted under 35 U.S.C. 154(b) by 380 days.

(21) Appl. No.: 16/795,298

(22) Filed: Feb. 19, 2020

(65) Prior Publication Data

US 2021/0213372 A1    Jul. 15, 2021

Related U.S. Application Data

(60) Provisional application No. 62/946,937, filed on Dec. 11, 2019.

(51) Int. Cl.
*B01D 5/00* (2006.01)
(52) U.S. Cl.
CPC ............ *B01D 5/009* (2013.01); *B01D 5/0009* (2013.01); *B01D 5/0015* (2013.01)
(58) Field of Classification Search
CPC ........ B01D 5/00; B01D 5/009; B01D 5/0009; B01D 5/0015; B01D 5/0051; C02F 1/78; E03B 3/28; Y02W 10/37
See application file for complete search history.

(56) References Cited

U.S. PATENT DOCUMENTS

| | | | |
|---|---|---|---|
| 3,675,442 A | 7/1972 | Swanson | |
| 6,574,979 B2 * | 6/2003 | Faqih | C02F 9/005 62/93 |
| 6,651,435 B1 | 11/2003 | Johnston | |
| 6,868,690 B2 * | 3/2005 | Faqih | C02F 9/005 62/93 |
| 6,945,063 B2 * | 9/2005 | Max | B01D 5/0042 136/246 |
| 10,071,918 B2 * | 9/2018 | Ackerman | B01D 5/006 |

(Continued)

OTHER PUBLICATIONS

The Written Opinion of the International Searching Authority, Application No. PCT/US21/18636, dated Jul. 22, 2021, 7 pages, International Searching Authority, U.S.

*Primary Examiner* — Jonathan Miller
(74) *Attorney, Agent, or Firm* — Richard A. Ryan

(57) ABSTRACT

An apparatus and system for producing fresh water from moisture-laden air. The apparatus has a frame supporting a plurality of condensation panels that each have a panel body defining a pair of condensation surfaces that will contact the moisture-laden air. A panel support mechanism supports each of the condensation panels in spaced apart relation to each other so each condensation surface contacts moisture-laden air. A flow channel inside the panel body defines a flow path for a cooling fluid that cools the condensation surfaces so the moisture-laden air will produce condensate thereon that collects as fresh water. The system includes a plurality of apparatuses, a chilling mechanism to cool the cooled fluid, inlet and discharge lines connecting the chilling mechanism and apparatuses, pumps to pressurize the cooled fluid, fans to move the moisture-laden air and water collecting surfaces to collect the fresh water.

16 Claims, 6 Drawing Sheets

(56) References Cited

U.S. PATENT DOCUMENTS

| | | | |
|---|---|---|---|
| 2002/0011075 A1* | 1/2002 | Faqih | C02F 9/005 |
| | | | 62/285 |
| 2004/0000165 A1* | 1/2004 | Max | E03B 3/28 |
| | | | 62/615 |
| 2006/0065001 A1 | 3/2006 | Bernardo Castanon Seoane | |
| 2013/0008633 A1 | 1/2013 | Gradinger et al. | |
| 2013/0312451 A1* | 11/2013 | Max | F25B 39/02 |
| | | | 165/104.11 |
| 2016/0229706 A1* | 8/2016 | Ackerman | C02F 1/16 |

* cited by examiner

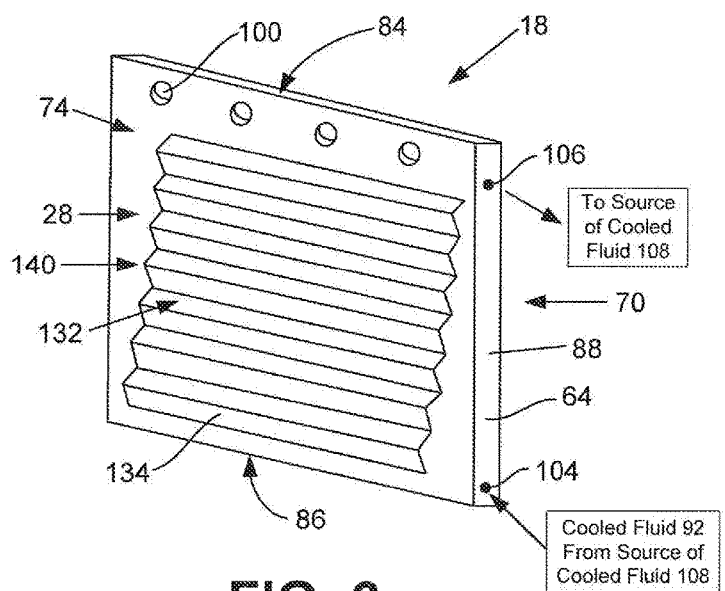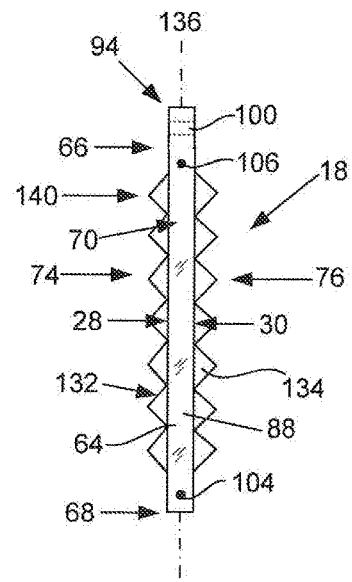
FIG. 6
FIG. 7
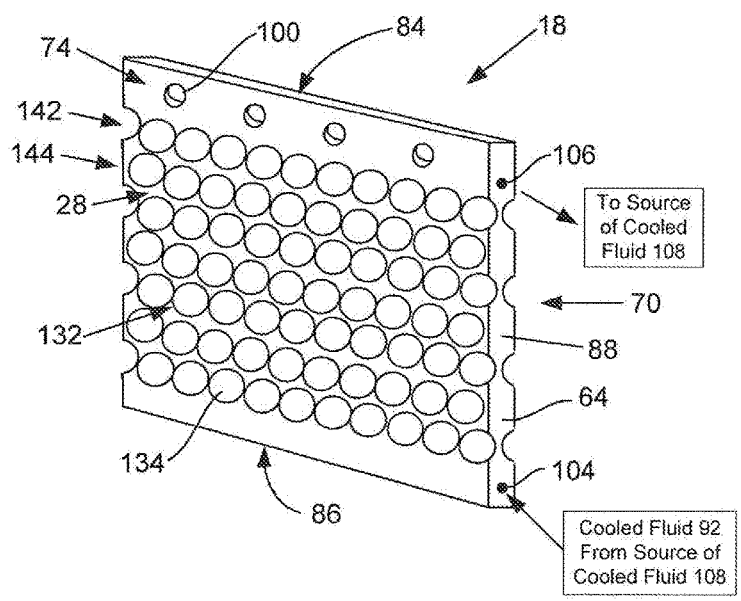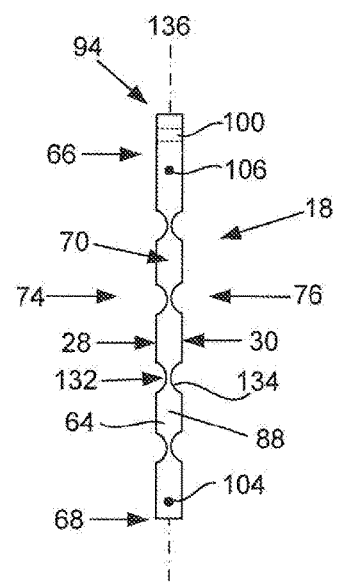
FIG. 8
FIG. 9

ATMOSPHERIC WATER GENERATING APPARATUS AND SYSTEM FOR PRODUCING WATER FROM MOISTURE-LADEN AIR

CROSS-REFERENCE TO RELATED APPLICATIONS

This patent application claims priority to U.S. Provisional Application Ser. No. 62/946,937 filed Dec. 11, 2019.

STATEMENT REGARDING FEDERALLY SPONSORED RESEARCH

Not Applicable.

REFERENCE TO A SEQUENCE LISTING, A TABLE OR A COMPUTER PROGRAM LISTING APPENDIX SUBMITTED ON A COMPACT DISC

Not Applicable.

BACKGROUND OF THE INVENTION

A. Field of the Invention

The field of the present invention relates generally to apparatuses and systems for the collection, production and generation of water. In particular, the present invention relates to apparatuses and systems for generating liquid water from the atmosphere. Even more particularly, the present invention relates to apparatuses and systems that utilize condensation modules which capture and condense water vapor in moisture-laden air to produce fresh water therefrom.

B. Background

As is well known, water is a precious resource that is necessary for life on our planet. Water is available to humans through the hydrological cycle and is most commonly withdrawn from lakes, rivers and underground reservoirs for use in homes, farms, businesses and various other personal and industrial uses. Despite the fact that the majority of the Earth's surface is covered by water, it is generally well known that clean fresh water is or may be a relatively scarce resource in many areas of the world. People who live in geographic areas that are near or otherwise have regular and adequate access to clean, fresh water from rivers, lakes and wells are fortunate in that these areas, at least presently, may not have issues with regard to having sufficient fresh water to meet the personal, business, industrial and/or agricultural needs of the area at a certain level of use. Unfortunately, many people live in areas that do not have such access, or at least easy access. to clean fresh water. Even people who live in areas that presently have access to clean fresh water via the traditional sources of fresh water have legitimate concerns that they should not take such availability for granted. Due to the potential for drought conditions, whether in the short term or potential long term due to climate change, many people live, work and produce crops or materials in areas where the future supply of fresh water cannot be guaranteed. In particular, contamination of fresh water sources due to human activities (including waste disposal, by-products of manufacturing and other human population pressures), climate change events that may reduce snow, melt glaciers or otherwise eliminate some presently relied upon sources of water and/or political disputes over the control of fresh water sources are ever present concerns with regard to the availability of fresh water. In addition, most areas of the world have the opportunity to beneficially utilize more fresh water if that water was made available for people, agriculture and industrial uses.

Individuals use fresh water for drinking, cleaning, cooking, bathing and other personal uses, for their pets and other animals and to water lawns, plants, trees and the like. Cities, states and other municipalities provide the fresh water to their residents and to other customers, as well as for their own uses, through water supply systems, comprising treatment plants, pipes and the like, that connect one or more of the traditional sources of water to the homes, parks and other locations where the fresh water is needed. The agricultural industry utilizes freshwater to grow crops that are consumed by animals and people, to provide water to animals and to grow trees and other plants for use for a wide variety of purposes, including lumber, clothing and the like. Industrial uses of fresh water, including water used by businesses at their offices, stores, restaurants and the like or by mines to mine minerals and energy, are used to produce products, food and other items that are used by people, businesses, governments and the military.

Unfortunately, the amount of available water is generally considered insufficient for all of the uses for which water is desired. As such, in the past there was a constant need to obtain additional water supply by building infrastructure such as dams, canals and the like to increase the storage of water and to move that water to make it available for the uses for which water is currently utilized, including various personal, agricultural and industrial uses. Over time, most easily identifiable and relatively cost effective locations for building dams and impounding water have been utilized and the building of new dams is unlikely due to the cost and, recently understood, environmental impacts of such dams. Other than taking water from rivers and lakes, including those created by building dams, another traditional method of obtaining fresh water comprises digging or drilling wells into underground sources of fresh water. Unfortunately, this method of generating a supply of fresh water is becoming much more difficult and, therefore, costly and is often less likely to produce sufficient amounts of cost effective clean fresh water due to the need to dig or drill deeper to find desirable fresh water aquifers. In fact, the rapid depletion of groundwater reserves is a major concern for many areas, particularly agricultural areas. In addition, the cost of electricity or fuel to operate the pumps to pump water from the underground aquifers is often very expensive.

A relatively recent method of generating fresh water is the desalination of water from the ocean or other high salt concentration water supplies, including some surface and groundwater supplies. In addition to generally only being useful for areas that are adjacent an ocean or near another source of salt water, due to the expense of transferring water away from such sources, desalination of sea water to generate fresh water generally requires facilities that are very expensive to build and require significant amounts of electricity and/or other energy sources to operate. Because of the complex technology and high costs, desalination does not presently produce any significant quantities of fresh water. Yet another method of generating fresh water involves the reclamation of waste water into fresh water. As with desalination, reclamation of waste water generally requires complex systems that are relatively expensive to build and operate and, as such, in most areas these systems do not produce significant quantities of fresh water.

A source of fresh water that has not been commonly or very frequently accessed to generate fresh water for human uses is the atmosphere. Although the Earth's atmosphere contains a relatively significant amount of water, in the form of water vapor that is measured in humidity, apparatuses and systems for generating fresh water from the atmosphere are not very common. Most such apparatuses and systems utilize one or more condensing methods to produce liquid water from the water vapor. Unfortunately, the presently available apparatuses and systems are generally not able to efficiently and effectively produce sufficient fresh water so as to be very useable, particularly on any large or industrial scale. One problem with many atmospheric water generating apparatuses and systems is that they require excessive amounts of electricity or other energy sources to operate the various components of the apparatus and/or system. Another problem with many of these apparatuses and systems is that they are not very efficient at removing water vapor from the atmosphere and, as such, do not produce a sufficient amount of fresh water for that water to be widely utilized.

What is needed, therefore, is an improved apparatus and system for generating fresh water from atmospheric air. The improved apparatus and system should be structured and arranged to effectively and efficiently remove water vapor from the atmosphere to produce fresh water that can be utilized for a wide variety of uses. More specifically, an improved apparatus and system for generating fresh water from atmospheric air should be configured so as to effectively and efficiently separate water vapor from atmosphere air in order to generate fresh water that can be beneficially utilized for a variety of human-related activities, including personal, agricultural and industrial uses. In preferred configurations, an improved apparatus and system for producing water from the atmosphere should be adaptable to being able to produce large quantities of fresh water. In one configuration, an improved apparatus and system for generating fresh water from atmospheric air should be structured and arranged, at least in a preferred configuration, to not require any external sources of electricity or electrical systems to operate, which can reduce the cost of producing the water and allow the system to operate to produce fresh water in case of an electrical grid failure or other system-wide loss of electricity. In the preferred configurations, the new apparatus and system should be configured to be easy to operate and relatively inexpensive to build.

SUMMARY OF THE INVENTION

The following presents a simplified summary of the disclosure of the present invention in order to provide a basic understanding of the invention to the reader. As such, this Summary is not an extensive overview of the disclosure and it may not identify key/critical elements of the invention or delineate the scope of the invention. The sole purpose of this Summary is to present some concepts disclosed herein in a simplified form as a prelude to the more detailed description that is presented below.

The use of terms such as "including", "comprising" or "having" and variations thereof herein is meant to encompass the items listed thereafter and equivalents thereof. The terms "a" and "an" herein do not denote a limitation of quantity, but rather denote the presence of at least one of the referenced item. Further, the use of terms "first", "second", and "third", and the like, herein do not denote any order, quantity, or importance, but rather are used to distinguish one element or feature of an element from another. The term "and/or," when used herein with a list of two or more items, means that any one of the listed items can be employed by itself, or any combination of two or more of the listed items can be employed.

The new apparatus and system of the present invention provides the various benefits and solves the problems that are identified above. That is to say, the present invention is directed to a new and improved system for producing fresh water from moisture-laden air, such the atmosphere. More specifically, the new atmospheric water generating apparatus and system of the present invention is beneficially structured and arranged to economically, efficiently and effectively condense water vapor in moisture-laden air to produce fresh water from such air that can be utilized for a wide variety of fresh water uses, including for personal, agricultural and industrial purposes. In a preferred configuration of the present invention, the new apparatus and system for producing water from moisture-laden air is able to produce large quantities of fresh water. In one configuration, the apparatus and system for generating fresh water from moisture-laden air of the present invention utilizes on-site production of power, such as electricity from solar panels, so as to not require any external source of electricity or electrical systems to operate. The on-site production of electricity to operate the system reduces the cost of producing the fresh water and allows the system to operate to produce fresh water in situations where there is an electrical grid failure or other system-wide loss of electricity. In the preferred configurations, the new apparatus and system are easy to operate and relatively inexpensive to build.

In one embodiment of the present invention, the new atmospheric water generating apparatus for producing fresh water from moisture-laden air generally comprises a frame having a plurality of frame members that define an upper end and a lower end of the apparatus, a condensation panel having a panel body which is supported by the frame, at least one condensation surface that is associated with the condensation panel and a flow channel disposed in the panel body of the condensation panel so as to define a flow path through the panel body between an inlet and an outlet of the condensation panel. The panel body of the condensation panel has an upper end and a lower end. The condensation surface of the condensation panel is structured and arranged with a surface area that will contact the moisture-laden air when the condensation panel is exposed to the moisture-laden air. The inlet is connected to a source of cooled fluid, with the flow channel being sized and configured to allow a cooled fluid from the source of cooled fluid to flow through the flow channel from the inlet to the outlet of the condensation panel. Preferably, the outlet is also connected to the source of cooled fluid to direct the cooled fluid thereto to provide a closed-loop cooling system. The flow path through the condensation panel is selected so the cooled fluid will cool the condensation surface of the condensation panel when the cooled fluid is flowing through the flow channel in a manner which produces condensate on the condensation surface when the condensation surface is in contact with the moisture-laden air. The condensation panel is configured for the condensate to flow downward to the lower end of the condensation panel and toward the lower end of the apparatus to collect as the fresh water on a water collecting surface that is associated with the apparatus. In a preferred configuration, the frame supports a plurality of condensation panels, with each of the plurality of condensation panels having a pair of opposite facing condensation surfaces that are in spaced apart relation to the condensation surfaces of any adjacent condensation panel or other surface so as to define an air gap therebetween to improve contact between the various condensation surfaces and the moisture-laden air.

The new apparatus has a panel support mechanism that is associated with the frame, with the panel support mechanism being structured and arranged to support each of the plurality of condensation panels in or on the frame. The panel support mechanisms can comprises one or more panel support members that are structured and arranged to position each of the condensation panels in the frame in corresponding relation to the frame with the upper end of each of the condensation panels directed toward the upper end of the apparatus and the lower end of each of the condensation panels directed toward the lower end of the apparatus. In one embodiment, each of the one or more panel support members comprise a support post that is connected to the frame, with the support post being cooperatively sized and configured with a support aperture in the panel body of the condensation panel so as to allow the support post to pass through the support aperture and support the condensation panel in the frame. In one configuration of this embodiment, the support aperture is positioned in a support tab that is attached to or integral with the upper end of the panel body so as to suspend the panel body downward from the support post in a hanging type arrangement.

In certain preferred embodiments, the condensation surface or surfaces of the condensation panel have a shaped surface that is configured to increase the surface area of the condensation surface so as to increase the condensate on the condensation surface and the amount of fresh water that is produced by the condensation panels. In one configuration, the shaped surface comprises a plurality of outwardly extending members and/or a plurality of concave areas, with each of the outwardly extending members and/or concave areas being sized and configured to increase the surface area of the condensation surface.

In one configuration, the fresh water produced by the condensation panels interacting with the moisture-laden air drains onto the floor of a building or other structure in which one or more apparatuses are housed. Alternatively, the apparatus can comprise a channel member which is attached to, integrally formed or otherwise associated with the frame and the water collecting surface, which may also be associated with the frame, is configured to direct the fresh water from the condensation panels to the channel member. The fresh water from the floor, channel member or other water collecting surface can be directed to a collection area that delivers the fresh water to a pipeline, canal, pond, reservoir or the like or directly to a field, orchard, business, home or mine where it will be utilized.

In another embodiment of the present invention, the atmospheric water generating system generally comprises a plurality of the above-described water generating apparatuses, moisture-laden air having water vapor associated therewith, a source of cooled fluid that produces a cooled fluid, one or more pumps interconnecting the source of cooled fluid and each of the apparatuses, one or more fans that are configured to direct the moisture-laden air to and around each of the apparatuses and to direct dried air away from each of the apparatuses, a source of power connected to at least one of the source of cooled fluid, the one or more pumps and the one or more fans, a water collecting surface associated with each of the apparatuses to collect the fresh water produced by the apparatuses, and at least one collection area to collect the fresh water and direct the fresh water to a pipeline, canal, pond, reservoir or the like or directly to a field, orchard, business, home or mine where it will be utilized. As set forth above, each of the apparatuses have a frame with a plurality of frame members that define an upper end and a lower end of the apparatus, at least one panel support mechanism associated with the frame and a plurality of condensation panels that are supported by the panel support mechanism on or in the frame. Each of the condensation panels have a panel body, a condensation surface associated with each of a first side and a second side of the panel body, a surface area associated with each of the condensation surfaces that will contact the moisture-laden air when the condensation panels are exposed to the moisture-laden air, and a flow channel in the panel body of each of the condensation panels that defines a flow path through the panel body between an inlet and an outlet of the condensation panel.

The inlet of each of the condensation panels of each apparatus is connected to the source of cooled fluid so as to receive the cooled fluid in the flow channels of the condensation panels. The outlet of each of the condensation panels is, preferably, connected to the source of cooled fluid to direct the cooled fluid thereto so as to define a closed-loop cooling system. The pumps are utilized to pressurize the cooled fluid and direct the cooled fluid to and through the flow channels of the condensation panels from the inlet to the outlet thereof and to pull the cooled fluid back to the source of cooled fluid for re-cooling. The collection area is in fluid flow connection with the water collecting surface so as to receive the fresh water from the water collecting surface. The flow path through each of the condensation panels is selected so the cooled fluid from the source of cooled fluid will cool each of the condensation surfaces of the condensation panels when the cooled fluid is flowing through the flow channels thereof so as to produce condensate on each of the condensation surfaces of each of the condensation panels when each of the condensation surfaces are in contact with moisture-laden air. Preferably, each of the condensation panels are configured for the condensate to flow downward to a lower end of the condensation panels and toward the lower end of each of the apparatuses to collect as fresh water on the water collecting surface. The panel support mechanism of each of the apparatuses comprises a plurality of panel support members. In one configuration, each of the plurality of panel support members are structured and arranged to position each condensation panel in the frame in corresponding relation to the frame with an upper end of each of the condensation panels directed toward the upper end of the apparatus and the lower end of each of the condensation panels directed toward the lower end of the apparatus. In one embodiment, each of the one or more panel support members comprise a support post that is connected to the frame, with the support post being cooperatively sized and configured with a support aperture in the panel body of the condensation panel so as to allow the support post to pass through the support aperture and support the condensation panel in the frame. In a possible preferred embodiment, the condensation surfaces of each of the condensation panels have a shaped surface, with the shaped surfaces being configured to increase the surface area of the condensation surfaces to increase the condensate on the condensation surface and the fresh water produced thereby. The apparatuses can be located in a building having a floor that functions as the water collecting surface. The source of cooled fluid can comprise one or more chilling mechanisms, which may also be located inside the building or other structure.

Accordingly, the primary object of the present invention is to provide a new apparatus and system for producing fresh water from the atmosphere and/or other moisture-laden air that has the advantages set forth above and which overcomes the various disadvantages and limitations which are associated with presently available methods, apparatuses and systems for producing fresh water from moisture-laden air.

It is an important object of the present invention to provide a new apparatus and system that is structured and arranged to produce fresh water from water vapor in moisture-laden air, including atmospheric air, in a manner which is able to produce relatively large quantities of fresh water therefrom for use of the fresh water for a wide variety of personal, agricultural and industrial uses.

It is also an important object of the present invention to provide a new apparatus and system that is structured and arranged to produce fresh water from moisture in the atmospheric air in a manner which is cost effective.

An important aspect of the present invention is that it provides a new atmospheric water generating apparatus and system which accomplishes the objectives set forth above and elsewhere in the present disclosure.

Another important aspect of the present invention is that it provides a new apparatus and system for producing fresh water from moisture-laden air which is structured and arranged to economically, efficiently and effectively condense water vapor that is present in the atmosphere or other moisture-laden air as condensate on one or more condensation surface so as to produce fresh water which can be utilized for a wide variety of fresh water uses, including for personal, agricultural and industrial purposes.

Another important aspect of the present invention is that it provides an atmospheric water generating apparatus and system for producing fresh water from the atmosphere and/or other moisture-laden air that can be structured and arranged so as to be able to produce large quantities of fresh water.

Another important aspect of the present invention is that it provides an atmospheric water generating apparatus and system for producing water from moisture-laden air that can be structured and arranged, in one or more preferred configurations, for the on-site production of power, such as electricity from solar panels, so as to not require any external source of electricity or electrical systems to operate, which will reduce the cost of producing the fresh water and allow the system to produce fresh water in situations where there is an electrical grid failure or other system-wide loss of electricity.

Another important aspect of the present invention is that it provides an improved atmospheric water generating apparatus for producing fresh water from the atmosphere and/or other moisture-laden air which comprises a frame that supports a plurality interconnected spaced apart condensation panels which are each configured to allow a cooling fluid to pass through a flow channel inside the panel body along a flow path in order to cool condensation surfaces each of the condensation panels so as to condense water vapor which is removed from the moisture-laden air as condensate on the outer condensation surfaces of the panels that will drip or flow downward to produce fresh water.

Another important aspect of the present invention is that it provides an improved atmospheric water generating system for producing fresh water from the atmosphere and/or other moisture-laden air which comprises a plurality of specially configured atmospheric water generating apparatuses that each have a plurality of interconnected spaced apart condensation panels through which a cooling fluid is passed to condense water vapor in the moisture-laden air on the outer surfaces of the panels and then drain the fresh water to a water collection basin for further distribution to any of a wide variety of fresh water uses.

Yet another important aspect of the present invention is that it provides a new atmospheric water generating apparatus and system for producing fresh water from moisture-laden air which, in the preferred configurations, is easy to operate and relatively inexpensive to build.

As will be explained in greater detail by reference to the attached figures and the description of the preferred embodiments which follow, the above and other objects and aspects are accomplished or provided by the present invention. As set forth herein and will be readily appreciated by persons who are skilled in the art, the present invention resides in the novel features of form, construction, mode of operation and combination of processes presently described and understood by the claims. The description of the invention which follows is presented for purposes of illustrating one or more of the preferred embodiments of the present invention and is not intended to be exhaustive or limiting of the invention. The scope of the invention is only limited by the claims which follow after the discussion.

BRIEF DESCRIPTION OF THE DRAWINGS

In the drawings which illustrate the preferred embodiments and the best modes presently contemplated for carrying out the present invention:

FIG. 6 is a side perspective view of a first alternative configuration for the condensation panels of the atmospheric water generating apparatus of FIG. 1 showing a shaped surface having a plurality of outwardly extending members;

FIG. 7 is a front view of the condensation panel of FIG. 6;

FIG. 8 is a side perspective view of a second alternative configuration for the condensation panels of the atmospheric water generating apparatus of FIG. 1 showing a shaped surface having a plurality of concave areas;

FIG. 9 is a front view of the condensation panel of FIG. 8;

DETAILED DESCRIPTION OF THE PREFERRED EMBODIMENTS

With reference to the figures where like elements have been given like numerical designations to facilitate the reader's understanding of the present invention, the preferred embodiments of the present invention are set forth below. The enclosed figures are illustrative of several potential preferred embodiments and, therefore, are included to represent several different ways of configuring the present invention. Although specific components, materials, configurations and uses are illustrated, it should be understood that a number of variations to the components and to the configuration of those components described herein and shown in the accompanying figures can be made without changing the scope and function of the invention set forth herein. For instance, although the description and figures included herewith generally describe and show particular materials, shapes and configurations for the various components of the apparatus of the present invention, as well as example configurations for condensation panels that may be utilized with the new apparatus, cooling fluids to cool one or more surfaces of the condensation panels and a frame that is configured to support a plurality of such condensation panels, persons who are skilled in the relevant art will readily appreciate that the present invention is not so limited. In addition, the exemplary embodiments of the present invention are shown and described herein with only those components that are required to disclose the present invention. As such, it may be possible that some of the necessary elements for attaching and using the present invention are not shown or necessarily described below, but which are well known to persons who are skilled in the relevant art. As will be readily appreciated by such persons, the various elements of the present invention that are described below may take on any form which is consistent with forms that may be understood by a person of ordinary skill in the art having knowledge of apparatuses utilized to condensate water from the atmosphere and fluids which may be utilized with such apparatuses to cool one or more surfaces of the apparatus.

Figure 10:
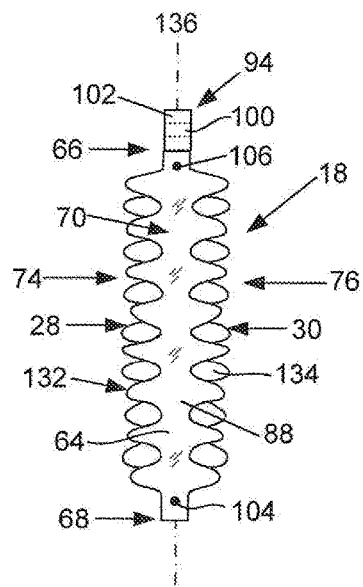
FIG. 10 is a front view of a third alternative configuration for the condensation panels of the atmospheric water generating apparatus of FIG. 1 showing a shaped surface having a plurality of cone-shaped outwardly extending members.
Figure 11:
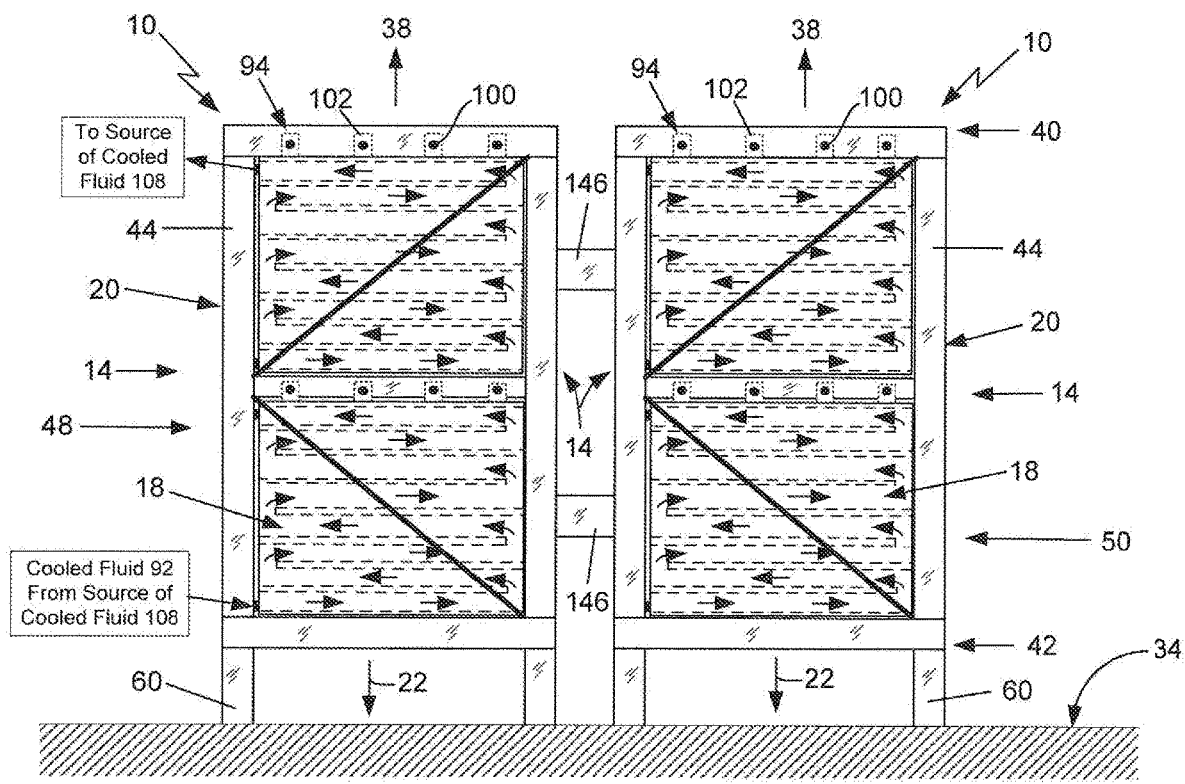
FIG. 11 is a side view of a pair of atmospheric water generating apparatuses joined together to form a double rack of condensation panels.
Figure 12:
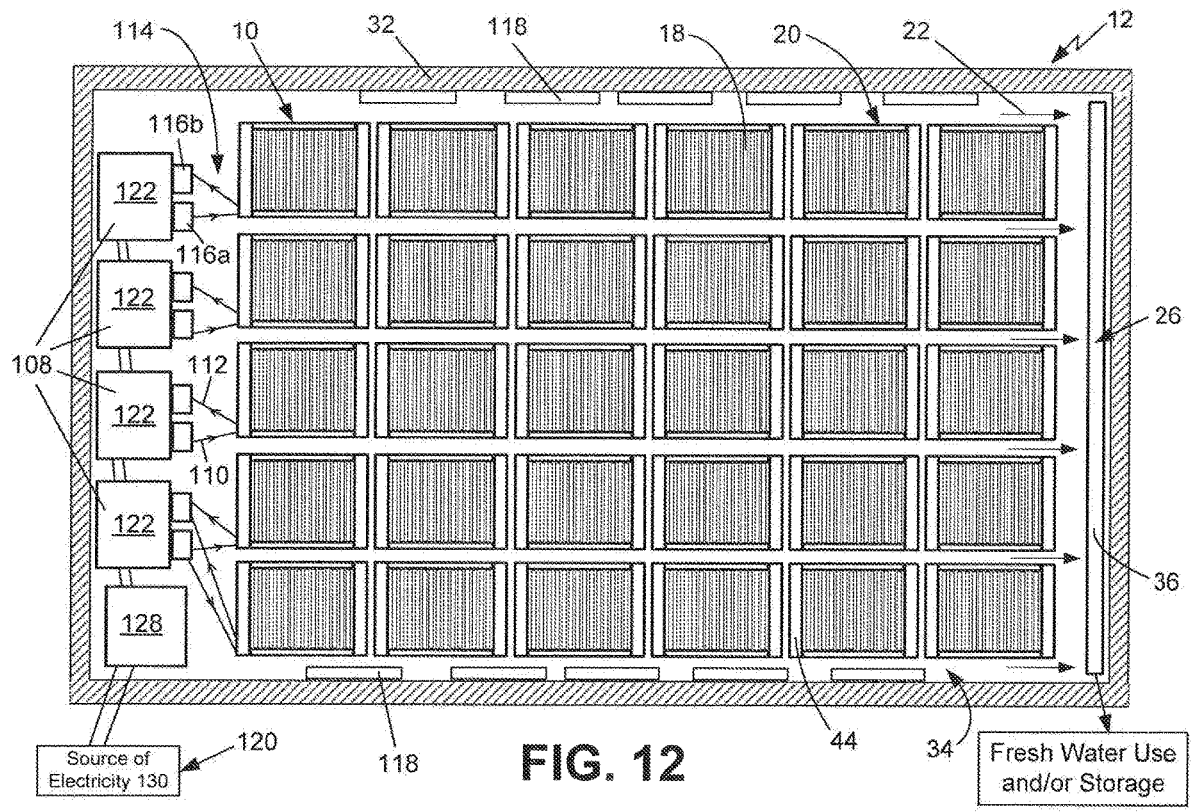
FIG. 12 is a top view of a floor plan of a building utilized for an atmospheric water generating system of the present invention showing use of a plurality of the new atmospheric water generating apparatuses and a plurality of chillers and electrical panel for such chillers for use with such apparatuses, with the floor being utilized for drainage to a plurality of drainage channels.
Figure 13:
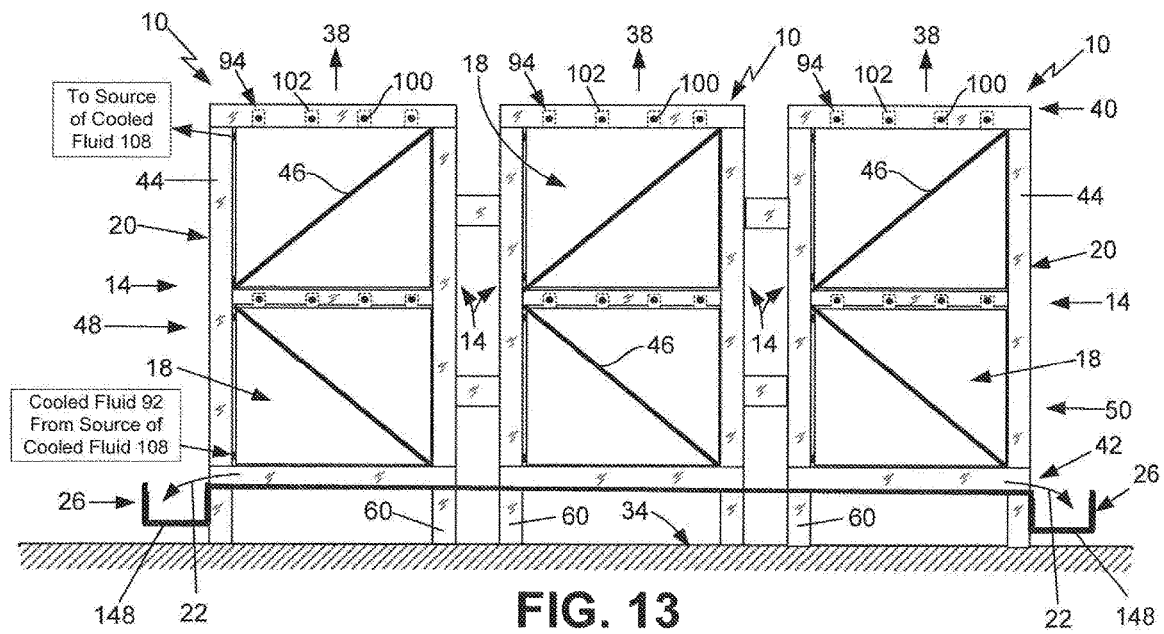
FIG. 13 is a side view a three connected apparatuses showing use of an attached or integrally formed drainage system comprising a plurality of channel members.
Figure 14:
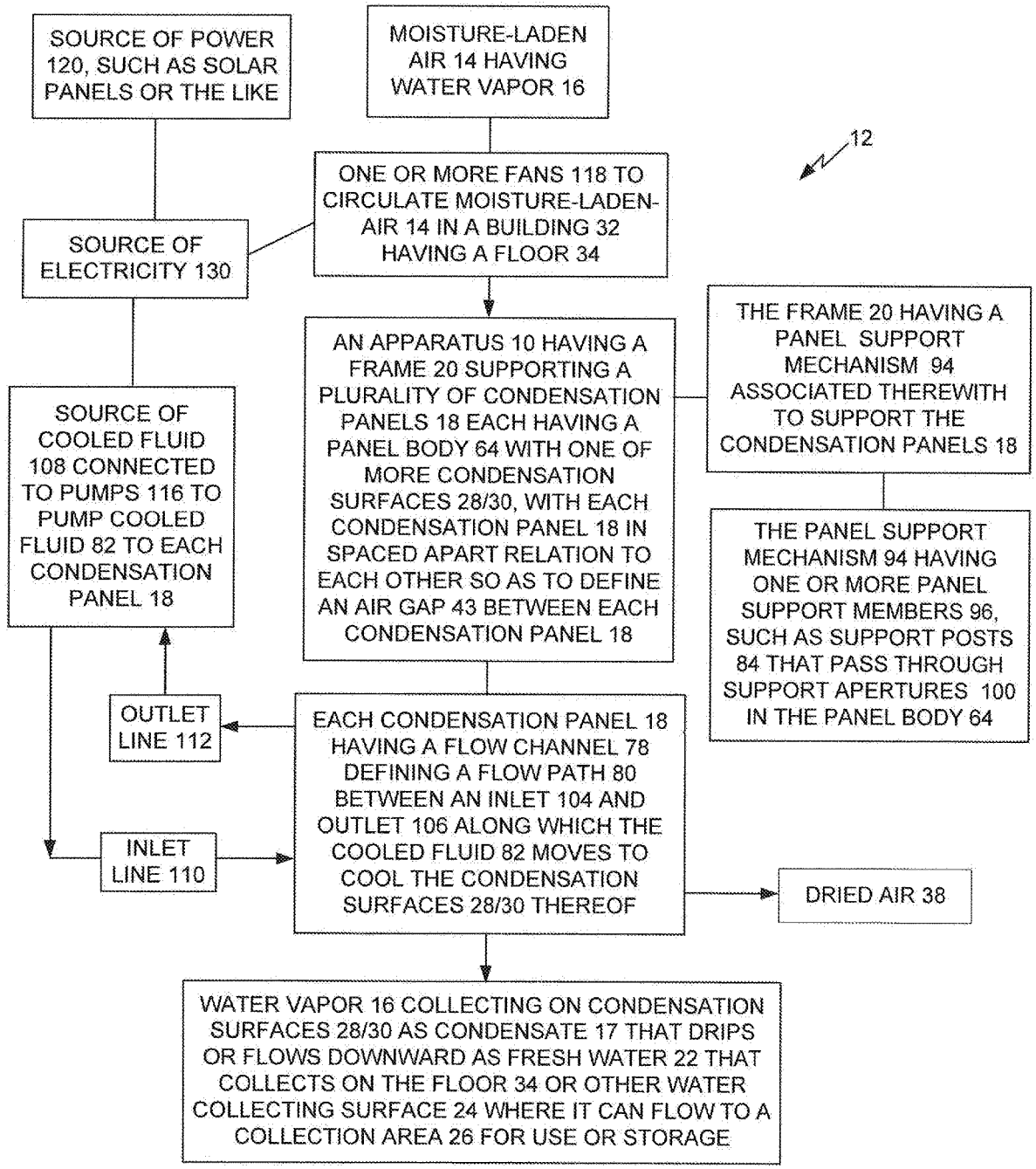
FIG. 14 is a block diagram showing a preferred configuration for an atmospheric water generating system of the present invention.

An atmospheric water generating apparatus that is configured pursuant to one or more of the preferred embodiments of the present invention is referred to generally as 10 in FIGS. 1 and 11-14. An atmospheric water generating system that is configured pursuant to one or more preferred embodiments of the present invention, which utilizes the new atmospheric water generating apparatus 10, is referred to generally as 12 in FIGS. 12-14. As set forth in more detail below and best shown in FIGS. 1-2 and 11-14, the new atmospheric water generating apparatus (hereinafter referred to as the "apparatus 10") of the atmospheric water generating system (hereinafter referred to as the "system" 12) is structured and arranged to receive moisture-laden air 14 onto the apparatus 10 so that water vapor 16 from the moisture-laden air 14 will condense as condensate 17 on at least one, preferably a plurality of, condensation panels 18 which are supported by a frame 20 so that the produced fresh water 22 will collect on a water collecting surface 24 and be directed to a collection area 26 for distribution for use for various personal, agricultural, business and industrial uses, as set forth in the Background. As also set forth in more detail below, each of the condensation panels 18 have one or more condensation surfaces, such as those shown as first condensation surface 28 and second condensation surface 30 in FIGS. 3-11. Inside apparatus 10, the moisture-laden air 14 contacts the cooled condensation panels 18 such that the water vapor 16 therefrom will collect on the condensation surfaces 28/30 and drain generally downward along those surfaces 28/30 to collect on the water collecting surface 24 that directs the produced fresh water 22 to the collection area 26. In one embodiment, a plurality of apparatuses 10 are located inside a building or other structure 32 having a floor 34 that is utilized as the water collecting surface 24 that directs the produced water 22 to one or more channels 36 that serve as the water collection area 26, as best shown in FIG. 12. Dried air 38, which for purposes of the present invention is moisture-laden air 14 that has had much of the moisture removed therefrom as water vapor 16 by the condensation panels 18 of apparatus 10, exits the apparatus 10 at or near the upper end 40 thereof, as best shown in FIGS. 11 and 13-14, by rising away from the apparatus 10. As also shown in FIGS. in these figures, the produced fresh water 22 will typically flow from the apparatus 10, due to gravity, at or near the lower end 42 thereof, which may be supported on or above the floor 34 of the structure 32. As further set forth below, the new apparatus 10 and system 12 for producing fresh water 22 is specifically structured and arranged to effectively and efficiently generate clean produced fresh water 22 from the readily available moisture-laden air 14 in a manner that does not require the powered components of the new system 12, which components do not include the apparatuses 10 (i.e., they are not powered), to be connected to an external electrical grid or to require the use of fossil fuels and/or other non-renewable sources of energy.

For purposes of describing the features of the present invention, the term "atmosphere" is utilized to refer to the air at, near or around the apparatus 10 or the plurality of apparatuses 10. As will be readily understood by persons who are skilled in the art, the atmosphere which provides the moisture-laden air 14 may be the natural environmental atmospheric air which exists outdoors and which may be allowed to flow into a building/structure 32 through fans, cooling systems and the like or it may be air that exists entirely inside a building/structure 32, typically through recycling systems or the like, that is comprises natural atmospheric air which has been enhanced or not, including but without limitation being artificially humidified, to provide the moisture-laden air 14 necessary for operation of the apparatus 10 and system 12 of the present invention.

Figure 1:
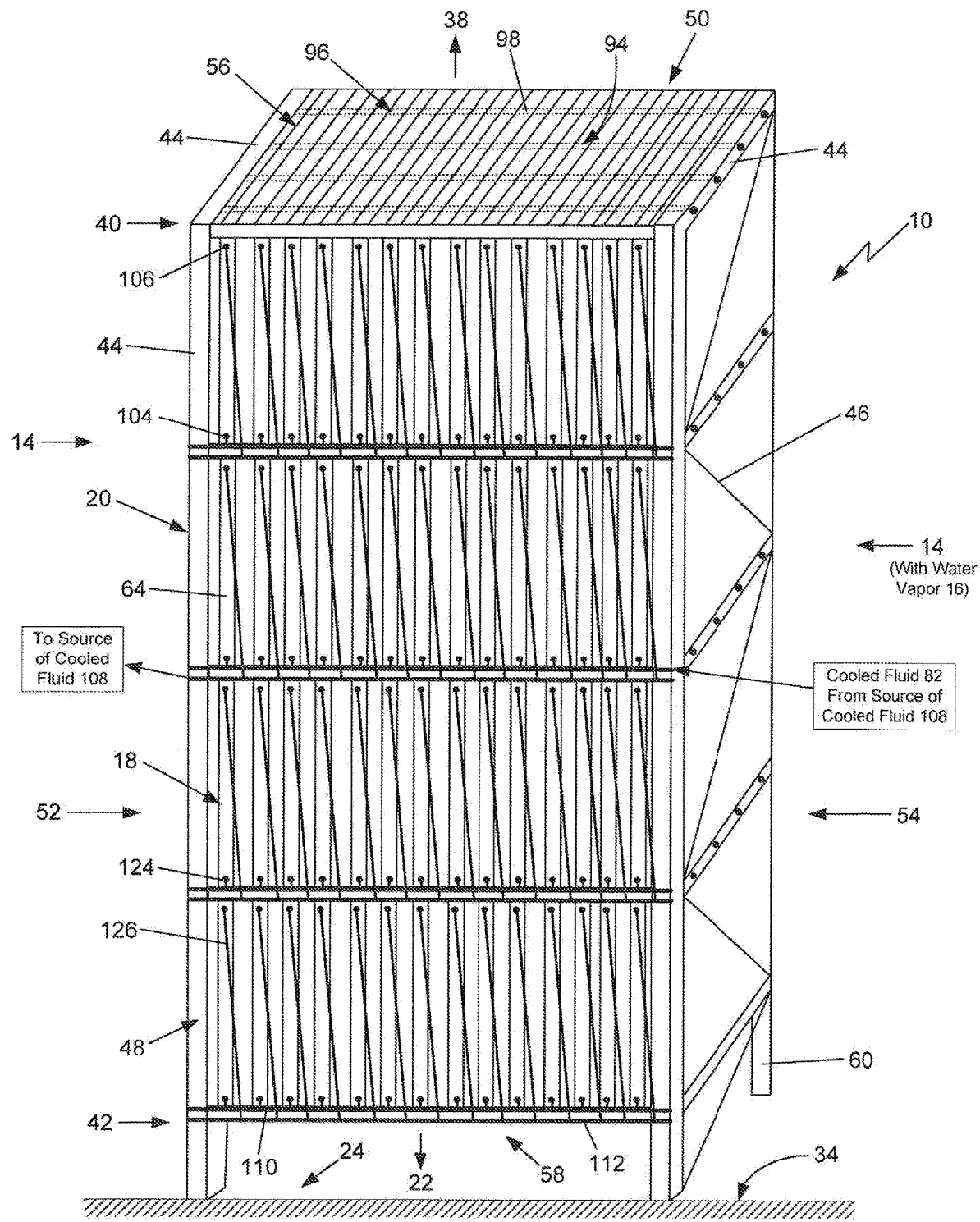
FIG. 1 is a front perspective view of an atmospheric water generating apparatus that is configured according to an embodiment of the present invention wherein a frame supports four rows of condensation panels, with each row having ten condensation panels, on the floor which is used for drainage.

As stated above, the various condensation panels 18 are supported by the frame 20 so as to position each of the condensation surfaces 28/30 of any condensation panel 18 in spaced apart relation to the condensation surfaces 28/30 of an adjacent condensation panel 18 or other surface so as to define an air gap 43 between condensation panels 18. Preferably, the frame 10 also supports the condensation panels 18 in spaced apart relation above the floor 34 and below the roof or ceiling (not shown) in order to further facilitate contact by the moisture-laden air 14 and the outflow of dried air 38. The frame 20 comprises a plurality of frame members 44, which may include cross-members 46, that are structured and arranged to support the condensation panels 18 in a manner which allows and facilitates contact by the moisture-laden air 14 and the movement away by the dried air 38. More specifically, the frame members 44 are attached to or integral with each other in a substantially open manner which results in most or, preferably all, of the sides of the frame 20 being open spaces that will not block, or at least block as little as possible, any movement and subsequent contact by the moisture-laden air 14 against the condensation surfaces 28/30 the condensation panels 18 and the exiting of dried air 38 away from of the condensation panels 18 that comprise the apparatus 10. The frame members 44 of frame 20 define a front side 48, back side 50, first or left side 52, second or right side 54, a top side 56 and bottom side 58 of apparatus 10, as best shown in FIGS. 1, 11 and 13. In the embodiment that is shown in the figures, one or more frame cross-members 46 are at each of the first/left side 52 and second/right side 54 (not shown) and the bottom side 58 is supported above the floor 34 by legs 60 so condensate 17 from water vapor 16 of the moisture-laden air 14 will drain as produced fresh water 22 from the lower end 42 of the apparatus 10 onto the floor 34. In some configurations, the one or more of the cross-members 46 or legs 60 may not be required. As set forth above, each of the sides of the frame 20 (namely front side 48, back side 50, first/left side 52, second/right side 54, top side 56 and bottom side 58) are primarily open spaces to allow moisture-laden air 14 to flow against or otherwise contact the condensation surfaces 28/30 of the condensation panels 18 and to allow the dried air 38 to move away from the condensation panels 18.

As will be readily appreciated by persons who are skilled in the art, in certain configurations of the new apparatus 10 and system 12, it may not be necessary (or in some instances, even preferred) to have the apparatuses 10 and certain other components of the system 12 inside a building or other structure 32 due, in part, to cost and/or certain environmental circumstances. However, for a typical configuration it is likely to be preferred that at least the apparatuses 10 and the flow lines and related components that connect to the apparatuses 10, are inside a building/structure 32. For instance, being inside a building/structure 32 is likely to benefit the working life of at least the condensation panels 18 of the apparatuses 10 by protecting them from UV radiation, dirt, hail and other weather and/or environmental issues. In addition, as set forth in more detail below, placing the apparatuses 10 inside a building/structure 32 will allow the user or operator of the new system 12 the ability to create and control the atmosphere to which the apparatuses 10 are exposed. More specifically, being inside a building/structure 32 will allow the user/operator to create a more humid environment around the apparatuses 10 and, therefore, increase the amount of moisture-laden air 14 that contacts the condensations surfaces 28/30 of the condensation panels 18. In one configuration, the building/structure 32 can be a relatively simple metal building that is sized and configured to hold the desired number of apparatuses 10 and any other components of the system 12 that can be benefit from being inside the building/structure 32. In one configuration, all or a portion of the floor 34 of the building/structure 32 is made out of concrete, stainless steel or other non-porous material to be the water collecting surface 24 that directs the produced fresh water 22 to collection areas 26 that are configured as channels 36 at or near the interior walls of the building/structure 32, as shown in FIG. 12. The channels 36 can be configured to direct the produced fresh water 22 to one or more of a pipeline, canal, reservoir or other location for further distribution to where the produced fresh water 22 can be utilized for personal, agricultural and/or industrial uses and/or to recharge a groundwater basin.

Figure 5:
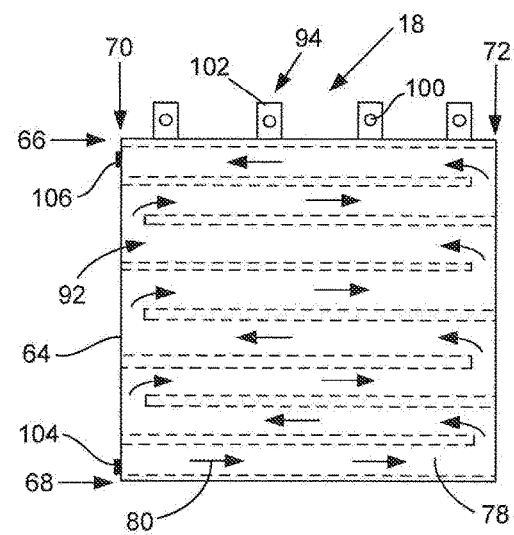
FIG. 5 is a right side view of the condensation panel of FIG. 3 showing the second condensation surface thereof and illustrating the internal flow channel and cooling fluid flow path which allows cooling fluid to pass through the interior of the condensation panel to cool the condensation surfaces thereof.

As set forth above, each of the condensation panels 18 are structured and arranged to provide at least one condensation surface, such as the first condensation surface 28 and the second condensation surface 30 shown in the FIGS. 3-10, against which moisture-laden air 14 will contact such that the water vapor 16 thereof will produce condensate 17 that will flow or drip down the condensation surface(s) 28/30 as produced fresh water 22. The condensation panels 18 of the apparatuses 10 can have a wide variety of different sizes and configurations to accomplish the objectives of the present invention. With regard to the exemplary condensation panels 18 shown in FIGS. 3-10, each condensation panel 18 has a panel body 64 with an upper end 66, lower end 68, front side 70, back side 72, a first/left side 74 (which defines the first condensation surface 28) and a second/left side 76 (which defines the second condensation surface 30). Inside the panel body 64 is a flow channel 78 that, in the preferred embodiment, is generally positioned between the lower end 68 and the upper end 66 along a flow path 80 to, as set forth in more detail below, is sized and configured to allow a cooled fluid 82 to flow through the entire, or nearly the entire, panel body 64 inside the flow channel 78 so as to cool or chill, principally, the condensation surfaces 28/30 of the condensation panels 18. The flow path 80 is the path or direction of the flow channel 78 inside the panel body 64 along which the cooled fluid 82 will flow during operation of the apparatus 10 and system 12. As best shown in FIGS. 5, 6 and 8, a preferred configuration for the flow path 80 of flow channel 78 is a back-and-forth or switchback type of path that will allow the cooled fluid 82 to cool/chill substantially the entire condensation surfaces 28/30. As will be readily appreciated by persons skilled in the art, the flow path 80 of the flow channel 78 is also likely to cool/chill the top surface 84 at the upper end 66, the bottom surface 86 at the lower end 68, the front surface 88 at the front end 70 and the back surface 90 at the back end 72. A result of this cooling/chilling effect, these surfaces 84/86/88/90 are likely to also function as condensation surfaces on which water vapor 16 is likely to collect as condensate 17. However, the contribution to the total amount of produced fresh water 22 which is produced by the apparatus 10 by these other, non-side surfaces 84/86/88/90 in the configuration of the condensation panels 18 shown in the figures is likely to be relatively minor compared to the primary condensation surfaces 28/30 on, respectively, the first/left side 74 and the second/right side 76 of the condensation panels 18 due to the significantly greater available surface area 92 provided by of the condensation surfaces 28/30. As set forth in more detail below, and which is readily understood by persons who are skilled in the relevant art, the amount of available surface area 92 to produce fresh water 22 will depend on the size and configuration of the panel body 64 at the condensation surfaces 28/30.

For purposes of describing the use and relative location of the various components of the present invention, the terms "upward", "upwardly", "upper", "top" and the like refer to a location that is at or toward the upper end 40 of apparatus 10 shown in FIGS. 1, 11 and 13 and the upper end 66 of the panel body 64 of the condensation panels shown in FIGS. 3-11 and, likewise, the terms "downward", "downwardly", "lower", "bottom" and the like refer to a location that is at or toward the lower end 42 of the apparatus 10 relative to the floor 34 and the lower end 68 of the panel body 64 shown in the figures referenced above.

The panel body 64 of the condensation panels 18 can be made out of a wide variety of different materials. Preferably, the materials selected for the panel body 64 is of the type that will allow the flow channel 78 to be easily and relatively inexpensively formed inside the panel body 64 in the desire flow path 80. In addition, the material selected for the panel body 64 must be able to efficiently facilitate transferring the lower temperature of the cooled fluid 82 to the surfaces, primarily the first 28 and second 30 condensation surfaces, of the panel body 64 so the water vapor 16 from the moisture-laden air 14 will produce the condensate 17 that results in the produced fresh water 22 as a result of the moisture-laden air 14 contacting the condensation surfaces 28/30. Preferably, the material selected for the panel body 64 most be chosen so as to at least not substantially chemically interact with the cooled fluid 82. Although the flow channel 78 can be cut into the panel body 64 after the panel body 64 is formed, in the preferred embodiments, the material for the panel body 64 is selected so the flow channel 78 can be integrally formed with the formation of the panel body 64 or formed by combining two halves of a condensation panel 18 together. In addition, the preferred material for the panel body 64 should be of the non-toxic, food grade type that is likely to at least reduce, if not eliminate, contaminating the condensate 17 and, therefore, the produced fresh water 22 therefrom, as the condensate 17 flows downward along the condensation surfaces 28/30 to the water collecting surface 24. In a preferred configuration the material should be relatively inexpensive to purchase and to form into the panel body 64. In addition, the material selected for the panel body 64 has to be able to be suitably formed or altered to be beneficially supported by the frame 20 in a manner which allow the moisture-laden air 14 to contact the condensation surfaces 28/30 and the dried air 38 to flow or otherwise move away from these surfaces 28/30. Although a variety of materials can provide or achieve most of the desired attributes, a preferred material for the panel body 64 of the condensation panels 18 is polyethylene and like plastics. In addition to the above characteristics, such materials are relatively lightweight, which will make the condensation panels 18 easier to handle and easier to have multiple condensation panels 18 supported by a relatively simple and inexpensive frame 20. The polyethylene panel body 64 of these condensation panels 18 can be blow molded or thermoformed with the flow channels 78 configured in the desired flow path 80. Although other materials, such as stainless steel, copper alloys, ceramics and the like can reduce the likelihood of contaminating the condensate 17 and the produced fresh water 22, these materials may be much more expensive, heavier and difficult to form with the flow channels 78 therethrough in the desired flow path 80.

In the preferred embodiments of the condensation panel 18 of the present invention, the flow channel 78 is formed from the same material of which the panel body 64 is formed such that the flow channel 78 is integral with the panel body 64. In alternative embodiments, the flow channel 78 can be defined by a pipe, tube or the like that moves through the interior of the panel body 64 to create the desired flow path 80. However, this latter configuration is not likely to be preferred due to the lower amount of heat transfer of temperature of the cooled fluid 82 as a result of the body of the pipe, tube or the like defining the flow channel inside the panel body. As such, it is highly desirable that the flow channel 78 be formed from the same material as the panel body 64 so the condensation surfaces 28/30 are most cooled by the cooled fluid 28/30.

Figure 2:
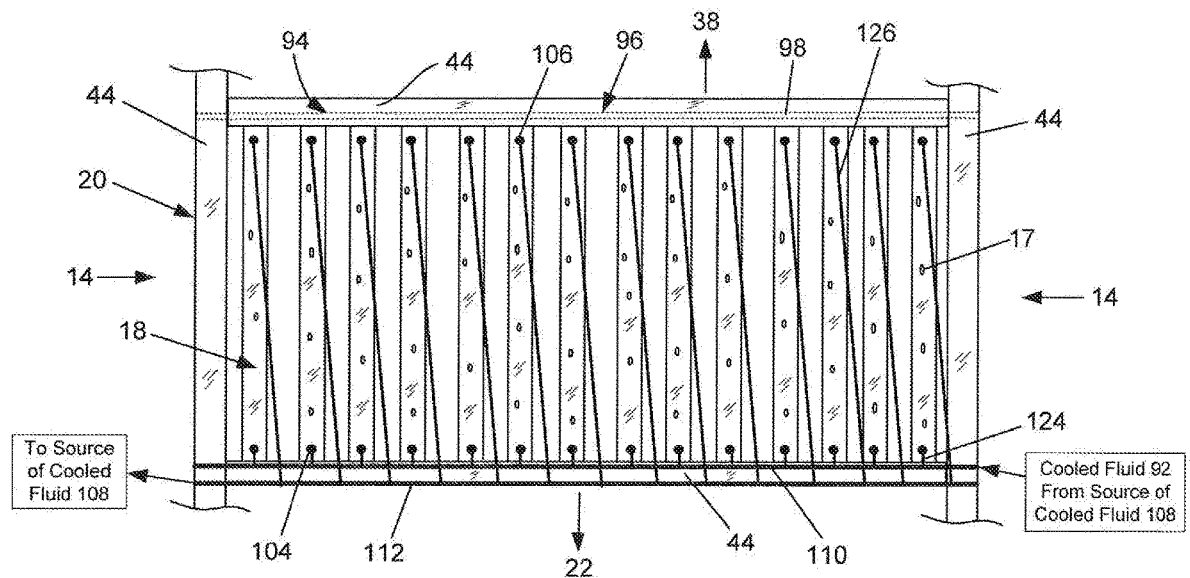
FIG. 2 is a front view of one row of condensation panels, support posts and cooling fluid piping of the apparatus of FIG. 1 to better show the various aspects thereof.
Figure 3:
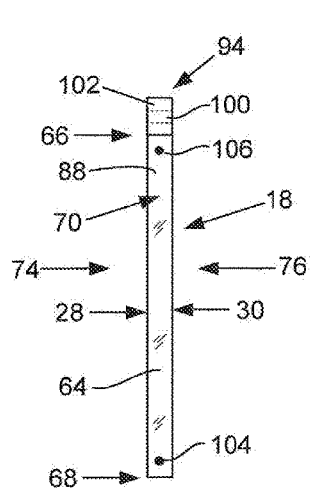
FIG. 3 is a front view of one condensation panel of FIG. 2.
Figure 4:
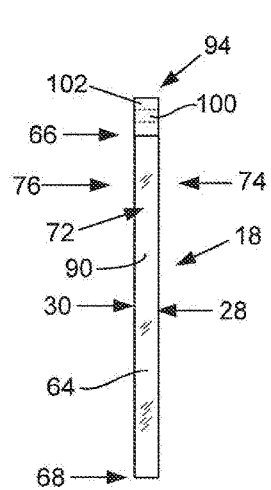
FIG. 4 is a back view of the condensation panel of FIG. 3.

As set forth above, in the preferred configurations of the apparatus 10 and system 12 of the present invention, the condensation panels 18 are supported by the frame 20 in by a panel support mechanism 94 that is configured to expose as much as possible of the condensation surfaces 28/30 of the condensation panels 18 to the moisture-laden air 14 so the water vapor 16 therefrom will form condensate 17 on the condensation surfaces 28/30 and produce the desired fresh water 22. As will be readily appreciated by persons who are skilled in the relevant arts, there are a wide variety of different types of panel support mechanisms 94 and configurations of panel support mechanisms 94 that can be utilized to position the condensation panels 18 in the frame 20 so that the condensation surfaces 28/30 of each of the condensation panels 18 are placed in spaced apart relation to each other to create the air gap 43 that facilitates contact by the moisture-laden air 14 with the condensation surfaces 28/30. In one embodiment, the panel support mechanism 94 comprises the condensation panels 18 being cooperatively configured with one or more panel support members 96 that are attached to or integral with the frame 20 so as to hang the condensation panels 18 from the panel support members 96, as best shown in FIGS. 1 and 2. In the embodiments shown in these figures the panel support members 96 are generally horizontally positioned elongated, rigid support posts 98 that extend across or substantially across the frame 20 between the first/left side 52 and second/right side 54 of the apparatus 10 so as to hangedly support the condensation panels 18. In this embodiment, the elongated support posts 98 are sized and configured to extend through cooperatively configured support apertures 100 provided in the panel body 64 of the condensation panels 18, as best shown in FIGS. 3-10. In the embodiment shown in the figures, the support posts 98 have a round cross-section and the support apertures 100 are circular. However, a wide variety of other shapes, whether the same or not, can be utilized for either or both of the support posts 98 and support apertures 100 (i.e., one being square the other being round or the like). The support apertures 100 can be nearly anywhere in the panel body 64. In the embodiments of the condensation panel 18 shown in FIGS. 2-5, the support apertures 100 are positioned in support tabs 102 that are attached to or integrally formed with the panel body 64 at the upper end 66 thereof, as best shown in FIG. 5. In the embodiments of the condensation panels shown in FIGS. 6-10, the support apertures 100 are positioned through the panel body 64 just below the upper end 66 thereof. As will be readily appreciated by persons skilled in the art, the support apertures 100 can be positioned, in addition or instead, at or near the center or lower end 68 of the panel body 64. In addition, as will also be readily appreciated by persons skilled in the art, the panel support mechanism 94 can comprise panel support members 96 that are non-rigid, including wires, ropes, cables and the like, that extend across the frame 20 and through the support apertures 100 of the condensation panels 18. In other embodiments, the panel support members 96 can be hooks, hangers or the like.

The condensation panels 18 can be made in a wide variety of sizes and shapes. In one example, the panel body 64 is rectangular shaped is sized so as to be approximately eight feet wide, six feet high and two inches thick. In this configuration and with the panel body 64 made out of a polyethylene material, the inventor has been able to produce one-half gallon of water per panel per day. As will be readily appreciated by persons skilled in the art, however, this dimension is provided only for exemplary purposes, as the panel body 64 of the condensation panels 64 can be square, round, triangular, oval or any other of a wide variety of shapes and be sized so as to be much smaller than the above example or much larger than the above example. Naturally, the size of the condensation surfaces 28/30 and the number of condensation panels 18 for a particular apparatus 10 is one of several factors, including the humidity of the moisture-laden air 14 and the temperature difference between the moisture-laden air 14 and the condensation surfaces 28/30, that will affect the amount of fresh water 22 that will be produced by the apparatus 10.

In the embodiments shown in the figures, each of the condensation panels 18 have an inlet 104 and an outlet 106 that are at opposite ends of the flow channel 78 through the interior of the panel body 64 that will receive the cooled fluid 82 into the flow channel 78 and allow the cooled fluid 82 (at a reduced temperature) to exit the flow channel 78 of the condensation panel 18, as best shown in FIGS. 3-20. As set forth in more detail below, the inlet 104 of the condensation panel 18 connects to a source of cooled fluid 108 by an inlet line 110, such as a hose or pipe, that delivers the cooled fluid 82 to the condensation panel 18 and a discharge line 112, such as a hose or pipe, that connects to the outlet 106 to take the reduced temperature cooled fluid 82 back to the source of cooled fluid 82 for re-cooling, thereby creating a closed-loop cooling system 114 that continually reuses the cooled fluid 82. The inlet 104 and outlet 106 are components of the new apparatus 10 and the cooled fluid 82, source of cooled fluid 108, a plurality of inlet lines 110 and a plurality of discharge lines 112 (as well as one or more apparatuses 10) are components of the new system 12.

In a preferred configuration of the system 12 of the present invention, best shown in FIGS. 12 and 14, the system 12 comprises a plurality of apparatuses 10 and the cooled fluid 82, source of cooled fluid 108, inlet lines 110 and discharge lines 112 described above. In addition, the new system 12 comprises one or more fluid pumps 116 to move the cooled fluid 82 from the source of cooled fluid 108 to the condensation panels 18 through the inlet lines 110, through the condensation panels 18 and through the discharge lines 112 from the condensation panels 18 back to the source of cooled fluid 108, one or more fans 118 to move the moisture-laden air 14 and dried air 38 inside the building or structure 32, and a source of power 120 to provide power, typically electrical power, to the source of cooled fluid 108, pumps 116 and fans 118.

The cooled fluid 82 should be selected to be able to be cooled to a sufficiently low temperature at the source of cooled fluid 108 so that it can be circulated through the closed-loop cooling system 114 and the flow channel 78 of the condensation panels 18 to cool the condensation surfaces 28/30 of the various apparatuses 10 that make up the system 12 to produce the desired amount of fresh water 22. As will be readily appreciated by persons who are skilled in the art, a wide variety of liquids or gases can be utilized as for cooled fluid 82 of the system 12. In one embodiment, the cooled fluid 108 is a liquid such as a combination of water and food grade ethylene glycol, propylene glycol or the like that can be cooled to twenty degrees Fahrenheit or another temperature so as to be sufficiently below (i.e., ten degrees) the dew point to allow condensate 17 to form on the condensation surfaces 28/30 from the water vapor 16 in the moisture-laden air 14. One advantage of these liquids is that they are known to be generally not toxic, easily able to get cold enough to accomplish the objectives of the present invention and are not likely to freeze in normal usage for the present system 12. In addition, the technology to cool the cooled fluid 82 to the temperature necessary to achieve the condensation benefits for the apparatus 10, namely forming condensate 17 from the water vapor 16 of the moisture-laden air 14, is generally easy to achieve with readily available chilling equipment and able to interact with readily available flow lines (whether hoses or pipes) without any significant modifications.

To cool and re-cool the cooled fluid 82 to the temperature necessary for the system 12 to accomplish the desired objectives, the source of cooled fluid 108 comprises one or more chilling mechanisms 122 that are configured to cool the cooled fluid 82 initially and to re-cool the cooled fluid 82 from the discharge lines 112 after it has warmed up from the heat transfer effects of passing through the flow channel 78 inside the panel body 64 and the condensation surfaces 28/30 interact with the moisture-laden air 14. In one embodiment, the chilling mechanism 122 comprises one or more outdoor central chillers that have either air-cooled scroll or rotary screw compressors. These devices, the use and configuration of which are well known to persons skilled in the relevant art, are designed to be used outdoors and are relatively easy to install, operate and maintain. If desired, as shown in FIG. 12, the one or more chilling mechanisms 122 can be placed inside the building/structure 32 that houses the various apparatuses 10 of the new system 12 so the discharge air from the chilling mechanisms 122 can be utilized as part of the moisture-laden air 14 inside the building/structure 32 which is circulated by the fans 118 to make contact with the condensation surfaces 28/30 of the various condensation panels 12 of the apparatuses 10 that make up the system 12. As set forth above, chilling mechanism(s) 122 are connected to the source of power 120.

As stated above, the closed-loop cooling system 114 of the system 12 of the present invention comprises one or more pumps 116 that are configured to move the cooling fluid 12 to, through and from the condensation panels 18 to cool the condensation surfaces 28/30 to produce the condensate 17 and, as a result, the fresh water 22. In the embodiment shown in FIGS. 12 and 14, the system 12 utilizes two pumps 116, a first or condenser pump 116a that pushes the cooled liquid 82 from the chilling mechanism(s) 122 (i.e., the source of cooled fluid 108) to each of the condensation panels 18 of the apparatuses 10 and a second or evaporator pump 116b that pulls the cooled liquid 82 from the condensation panels 18 back to the chilling mechanism(s) 122. In one configuration, the cooled fluid 82 is pumped through the inlet lines 110 and discharge lines 112 at a pressure of approximately twenty psi. In certain embodiments, one or more of the pumps 116a/116b can be attached to or made integral with the chilling mechanism 122. If not, the pumps 116a/116b are also connected to the source of power 120.

As set forth above, either or both of the inlet lines 110 and discharge lines 112 can be hoses, pipes or the like that connect the source of cooled fluid 108 to the condensation panels 18 of the apparatuses 10. In the configuration shown in the drawings, particularly FIGS. 1 and 2, each condensation panel 18 receives a cooled fluid 82 at its inlet 104 directly from the main inlet line 110 via a relatively short inlet connecting line 124, as opposed to receiving cooling fluid 82 after the cooling fluid 82 has passed through an adjacent condensation panel 18. As also shown in FIGS. 1 and 2, a short outlet connecting line 126 connects the outlet 106 of each condensation panel 18 to the discharge line 112. Although the inlet 104 and the outlet 106 can be located anywhere on the panel body 64 of the condensation panel 18, the present inventor has found that placing the inlet 104 to the flow channel 78 near the lower end 68 of the panel body 64 and the outlet 106 from the flow channel 78 near the upper end 66 of the panel body 64 is better at getting air out of the flow channel 78, which air would otherwise reduce the cooling effectiveness of the cooling fluid 82 cooling the condensation surfaces 28/30.

The fans 118, which are connected to the source of power 120, are utilized to move the moisture-laden air 14 and the dried air 38 around the various apparatuses 10 of the system 12. More specifically, the fans 118 are utilized to move the moisture-laden air 14 in the building/structure 32 so that the moisture-laden air 14 will constantly in movement to contact against the condensation surfaces 28/30 of the condensation panels 18 and will move dried air 38 away from the condensation surfaces 28/30 of the condensation panels 18. If desired, the building/structure can be provided with a venting system (not shown) that vents or otherwise directs the dried air 38 away from the condensation panels 18 and out of the building/structure 32 to the atmosphere or to a humidifying mechanism that will add humidity to the dried air 38 to recondition the dried air 38 back into the needed moisture-laden air 14.

The source of power 120 can be a wide variety of different types of devices and mechanisms which supply power to operate the source of cooled fluid 108 (including the chilling mechanisms 122), pumps 116, fans 118 and any other components of the system 12 which require power. In the embodiment shown in FIG. 12, the source of power 120 is an electrical panel 128 that is connected to a source of electricity 130. In one embodiment, the source of electricity 130 can be the standard electrical power source (i.e., electrical grid) provided by a utility company or the like. In a preferred embodiment, however, the source of electricity 130 comprises one or more on-site renewable energy systems, such as a solar power system comprising a plurality of solar panels, a wind power system having one or more wind turbines, a geothermal power source or the like.

In the embodiment shown in FIGS. 1-5, the condensation panels 18 are made out of a blend of polyethylene with an integration of nanotechnology that has smooth, generally planar condensation surfaces 28/30 to allow the condensate 17 to easily flow off of the condensation panels 18 as produced fresh water 22. In this embodiment, the surface area 92 of the condensation surfaces 28/30 which is available for contact with the moisture-laden air 14 to condense the water vapor 16 thereof into condensate 17 is purely determined by the effective outer dimensions of the condensation surfaces 28/30. In other embodiments, such as those shown in FIGS. 6-10, the condensation surfaces 28/30 are altered to increase the amount of surface area 92 for contact with the moisture-laden air 14 so as to increase the amount of water vapor 16 which is turned into condensate 17 and, as a result, fresh water 22.

The embodiment of the condensation panels 18 shown in FIGS. 6-10 are shown with the panel body 64 having one or more shaped surfaces 132 that increase the surface area 92 which will contact the moisture-laden air 14 relative to the planar or generally planar configuration of the condensation panels 18 shown in FIGS. 1-5. The shaped surfaces 132 of the panel body 64 can be any of a wide variety of shapes and combination of shapes that increase the surface area 92 of, in particular, one or both of the condensation surfaces 28/30 of the condensation panels 18. In FIGS. 6-7, the shaped surfaces 132 of the condensation surfaces 28/30 of the panel body 64 of condensation panels 18 each comprise a plurality of outwardly extending members 134 that have a generally triangle or pyramid shape which extends outwardly from the centerline 136 of the panel body 64 extending between the upper end 66 and the lower end 68 of the panel body 64, as best shown in FIG. 7 (also shown in FIGS. 9 and 10). As will be readily appreciated by persons who are skilled in the art, the outwardly extending members 134 provide a significant increase in the surface area 92 of the condensation surfaces 28/30. The increased surface area 92 will increase the amount of surface area 92 which is cooled by the cooled fluid 82, which increases the amount of condensation surface 28/30 that will be contacted by the moisture-laden air 14 for the water vapor 16 thereof to condense on and form condensate 17 that will drip or flow downward to collect as produced fresh water 22, as described above and best shown in FIGS. 1 and 14. FIGS. 8-9 show condensation panels 18 having the condensation surfaces 28/30 with shaped surfaces 132 that comprise a plurality of inwardly disposed concave areas 138 that also provide increased surface area 92 for contact with the moisture-laden air 14 to facilitate an increase in the production of condensate 17 from the water vapor 16 in the moisture-laden air 14 to increase the product of produced fresh water 22. In this configuration. In the embodiment of FIG. 10, the shaped surfaces 132 of the condensation surfaces 28/30 of the condensation panels comprise a plurality of generally cone-shaped outwardly extending members 134. In FIGS. 6-7, the outwardly extend members 134 are generally arranged to be linearly disposed in parallel adjacent rows 140 across the condensation surfaces 28/30. As shown with regard to the embodiment of FIGS. 8-10, however, it is not necessary to for the various elements of the shaped surfaces 132 (such as the concave areas 138 of FIGS. 8-9 or the cone-shaped outwardly extending members 134 of FIG. 10) to be linearly disposed across the condensation surfaces 28/30. In the embodiments of FIGS. 8-10, the shaped surfaces 132 comprise alternating rows, such as first alternating row 142 and second alternating row 144 that are configured with the alternating rows 142/144 in an offset relation to each other. As will be readily appreciated by persons who are skilled in the art, a wide variety of different shapes and different configurations of the rows 140 and alternating rows 142/144 can be utilized with the apparatus 10 and system 12 of the present invention to provide the benefits of an increase in surface area 92 as a result of a shaped surface 132 for the condensation panels 128/130 or any other area of the panel body 64 of the condensation panels 18. Specifically, the shapes can be different than the triangular/pyramid shaped or cone-shaped outwardly extending members 134 and different than the concave areas 138 shown in FIGS. 6-10 to provide more or less surface area 92 which will be contacted by the moisture-laden air 14.

FIG. 11 illustrates a side view of two apparatuses, shown as first apparatus 10*a* and second apparatus 10*b*, that are positioned adjacent each other in spaced apart relation and joined at the frames 20 by a plurality of connecting support members 146 that connect a frame member 44 of the first apparatus 10*a* to a frame member 44 of the second apparatus 10*b*. One benefit of connecting adjacent apparatuses 10*a*/10*b* are the likely improved structural support for the apparatuses 10*a*/10*b* as opposed to a single apparatus 10 standing alone. As will be readily appreciated by persons who are skilled in the art, a variety of different configurations of two or more adjacent apparatuses 10 can be utilized with system 12 and a variety of different types and configurations for the connecting support members 146 utilized to connect adjacent apparatuses 10*a*/10*b*.

FIG. 12 is a top view of a possible floor plan or layout of the system 12 in the building/structure 32. The figure shows use of a plurality of apparatuses 10 on the floor 32 of the building and several channels 36 that will collect the fresh water 22 that is produced from the plurality of apparatuses 10 as a result of the moisture-laden air 14 contacting the condensation surfaces 28/30 of the various condensation panels 18 of each apparatus 10, which condensation panels 18 are supported in spaced apart relation to each other by frame 20 to form the air gap 43 (as described above). FIG. 12 also shows a plurality of chilling mechanisms 122, as the source of cooled liquid 108, pumps 116, fans 118 and electrical panel 128 that connects to a source of power 120, which is a source of electricity 130 (such as the standard electrical grid, a plurality of solar panels and/or other sources). The inlet line 110 and discharge line 112 are shown connecting the chilling mechanisms 122 to apparatuses 10, creating the closed-loop cooling system 114.

FIG. 13 is a side view of three adjacent apparatuses, shown as first apparatus 10a, second apparatus 10b and third apparatus 10c, that are positioned in spaced apart relation to the floor 32 by legs 60. The apparatuses 10a/10b/10c have a common water collecting surface 24 that collects and directs the fresh water 22 produced by the apparatuses 10a/10b/10c to a pair of channel members 148 that act as the collection areas 26 to direct the fresh water 22 to another location, such as a piping system, canal, collecting basin or pond, field, orchard or other area for storing and/or using the fresh water. In this configuration, the floor 32 is not used as the water collecting surface 24. As will be readily appreciated by persons who are skilled in the art, a wide variety of different configurations can be utilized for a system 12 having channel members 148 for one or more apparatuses 10 to direct the fresh water 22 produced by the one or more apparatuses 10 to where the fresh water 22 can be stored or beneficially utilized.

FIG. 14 shows a block diagram of one configuration of the system 12 of the present invention. The system 12 comprises one or more apparatuses 10, a source of cooled fluid 108 that supplies cooled fluid 82, moisture-laden air 14 that interacts with the apparatuses 10 to produce fresh water 22, one or more inlet lines 110 through which the cooled liquid 82 flows to the apparatuses 10, one or more discharge lines 112 that carry the formerly cooled fluid 82 back to the source of cooled fluid 108 to be re-cooled, one or more pumps 116 that move the cooled fluid through the inlet lines 110, discharge lines 112 and apparatuses 10, one or more fans 118 that move the moisture-laden air 14 around the apparatuses 10 and dried air 38 away from the apparatuses 10, a source of power which is utilized by the source of cooled fluid 108, pumps 116 and fans 118 to accomplish the objectives of these components, at least one water collecting surface 24 which collects the fresh water 22 produced by the apparatuses 10 and one or more collection areas 26 to which the collected fresh water 22 is directed by the water collecting surfaces 24 so that the fresh water 22 can be stored or used. As set forth above, each of the apparatuses 10 have condensation panels 18 with one or more condensation surfaces 28/30 that interact with moisture-laden air 14 such that the water vapor 16 thereof will form as condensate 17 on the condensation surfaces 28/30 and drip or flow downward to the water collection surfaces 24. The source of cooled fluid 108 can comprise one or more chilling mechanisms 122 that chill the cooled fluid 82 to a sufficient temperature (such as twenty degrees Fahrenheit) to enable the water vapor 16 in the moisture-laden air 14 to form condensate 17 on the condensation surfaces 28/30 of the condensation panels 18 of each of the apparatuses 10 in the system 12. In one configuration, part or all of the components of system 12 are in a building or other structure 32 that is suitably sized and configured to enclose these components. In one configuration, the building/structure 12 is a metal building that can have a plurality of solar panels thereon to function as a source of electricity 130 for the source of power 120 that is utilized by the powered components of the system 12. If desired, or deemed necessary, the system 12 can also include one or more humidifying mechanisms that would be structured and arranged to add humidity to the improve the amount of water vapor 16 in the moisture-laden air 14 to increase the amount of fresh water 22 produced by the apparatuses 10. Typically, any such humidifying mechanisms would connect to the same source of power 120 that provides power to the other powered components of the system 12.

As set forth above, the condensation panels 18 have a flow channel 78 that follows a flow path 80 inside the panel body 64 to move cooled fluid 82 throughout the interior of the panel body 64 so as to create condensation surfaces 28/30 that will interact with the moisture-laden air 14 to produce condensate 17 from the water vapor 16 of the air 14 that will drip or flow downward as fresh water 11. As will be readily appreciated by persons who are skilled in the art, the flow channel 78 and flow paths 80 are engineered so as to be sized and configured to accomplish the desired objectives of providing cooled condensation surfaces 28/30, whether the condensation surfaces 28/30 are planar are shaped surfaces 132 having outwardly extending members 134 and/or concave areas 138. The inlet line 110 that delivers cooled fluid 82 from the source of cooled fluid 108 connects to an inlet connecting line 124 that connects to the inlet 104, which may be a female threaded NPT ½" connection or the like, to direct the cooled fluid 82 into the flow channel 78. The cooled fluid 82 flows through the flow channel 78 along the flow path 80 to the outlet 106, which may also be a female threaded NPT ½" connection or the like, where it connects to an outlet connecting line 126 that directs the cooled fluid 82 (which has warmed up) to the discharge line 112 that directs this warmed-up cooled fluid 82 to the chilling mechanisms 122 or other source of cooled fluid 108 that re-cools the cooled fluid 82 to the desired lower temperature to produce the condensate 17 on the condensation surfaces 28/30 of the condensation panels 18 of the apparatuses 10. Pumps 116, such as the first/condenser pump 116a and the second/evaporator pump 116b, pressurize the flow lines 110/112 to move the cooled fluid 82 to, through and from each of the apparatuses 10 of the system 12. The fans 118 move the moisture-laden air 14 to facilitate contact with the condensation panels 18 and move the dried air 38 away from the apparatuses 10 after water vapor 16 has been removed (by condensation) from the moisture-laden air 14 after contact with the condensation panels 18. To facilitate the heat transfer between the moisture-laden air 14 and the condensation surfaces 28/30 of the condensation panels 18, each of the condensation panels 18 are supported in spaced apart relation to each other inside the frame 20 of the apparatus 10 to form the air gap 43 that facilitates the moisture-laden air 14 contacting each of the condensation surfaces 28/30. The condensation panels 18 are supported by a panel support mechanism 94 associated with the frame 20. The panel support mechanism 94 can be one or more panel support members 96, such as the stiff elongated support posts 98 shown in the figures, or they can be wires, hooks, hangers or the like that appropriately support the condensation panels 18 in spaced apart relation to each other so the moisture-laden air 14 can interact with the condensation surfaces 28/30 of the condensation panels 18 to produce the condensate 17 from the water vapor 16 in the moisture-laden air 14 that produces the fresh water 22.

While there are shown and described herein specific forms of the invention, it will be readily apparent to those persons who are skilled in the art that the invention is not so limited, but is susceptible to various modifications and rearrangements in design and materials without departing from the spirit and scope of the invention. In particular, it should be noted that the present invention is subject to modification with regard to any dimensional relationships set forth herein and modifications in assembly, materials, size, shape and use. For instance, there may be numerous components of the embodiments described herein that can be readily replaced with equivalent functioning components to accomplish the objectives and obtain the desired aspects of the present invention. The various embodiments set forth herein are intended to explain the best mode of making and using the present invention as currently known to and appreciated by the present inventor and to enable other persons who are skilled in the relevant art to make and utilize the present invention. Although, the described embodiments may comprise different features, not all of these features are required in all embodiments of the present invention. More specifically, as will be readily appreciated by persons who are skilled in the art, certain embodiments of the present invention only utilize some of the features and/or combinations of features that are disclosed herein.

What is claimed is:

1. An atmospheric water generating apparatus to produce fresh water from moisture-laden air, said apparatus comprising:

a frame having a plurality of frame members defining an upper end and a lower end of said apparatus;

a plurality of condensation panels supported by said frame, each of said condensation panels having a panel body with an upper end and a lower end;

at least one condensation surface associated with each of said condensation panels, said condensation surface of each of said plurality of condensation panels being in spaced apart relation to said condensation surface of each of the condensation surfaces of other of said plurality of condensation panels, each of said condensation surfaces being structured and arranged with a surface area thereof that will contact the moisture-laden air when said condensation panel is exposed to the moisture-laden air;

a panel support mechanism associated with said frame, said panel support mechanism being structured and arranged to support each of said plurality of condensation panels in or on said frame, said panel support mechanism having one or more panel support members that are structured and arranged to position each of said condensation panels in corresponding relation to said frame with said upper end of each of said condensation panels directed toward said upper end of said apparatus and said lower end of each of said condensation panels directed toward said lower end of said apparatus, each of said one or more panel support members having a support post connected to said frame, said support post cooperatively sized and configured with a support aperture in said panel body of said condensation panel so as to allow said support post to pass through said support aperture and support said condensation panel in or on said frame; and a flow channel disposed in said panel body of each of said condensation panels so as to define a flow path through said panel body between an inlet and an outlet of said condensation panel, said inlet connected to a source of cooled fluid, said flow channel being sized and configured to allow a cooled fluid from the source of cooled fluid to flow through said flow channel from said inlet to said outlet of said condensation panel, said outlet connected to the source of cooled fluid to direct the cooled fluid thereto, wherein said flow path through each of said condensation panels is selected so the cooled fluid will cool said condensation surface of each of said condensation panels when the cooled fluid is flowing through said flow channel to produce condensate on said condensation surface when said condensation surface is in contact with the moisture-laden air, each of said condensation panels configured for the condensate to flow downward to said lower end of said condensation panel and toward said lower end of said apparatus to collect as the fresh water on a water collecting surface that is associated with said apparatus.

2. The apparatus of claim 1, wherein said support aperture is positioned in a support tab that is attached to or integral with said upper end of said panel body so as to suspend said panel body downward from said support post.

3. The apparatus of claim 1, wherein said condensation surface of each of said condensation panels has a shaped surface, said shaped surface configured to increase said surface area of said condensation surface so as to increase the condensate on said condensation surface and the fresh water produced thereby.

4. The apparatus of claim 3, wherein said shaped surface comprises a plurality of outwardly extending members and/or a plurality of concave areas, each of said outwardly extending members and/or said concave areas being sized and configured to increase said surface area of said condensation surface.

5. The apparatus of claim 1 further comprising a channel member associated with said frame, said water collecting surface associated with said frame so as to direct the fresh water from said plurality of condensation panels to said channel member.

6. An atmospheric water generating apparatus to produce fresh water from moisture-laden air, said apparatus comprising:

a frame having a plurality of frame members defining an upper end and a lower end of said apparatus;

at least one panel support mechanism associated with said frame;

a plurality of condensation panels supported by said panel support mechanism so as to dispose each of said condensation panels on or in said frame, each of said condensation panels having a panel body with an upper end, a lower end, a front side, a back side, a first side and a second side;

a condensation surface associated with each of said first side and said second side of said condensation panel, each of said condensation surfaces being structured and arranged with a surface area that will contact the moisture-laden air when said condensation panel is exposed to the moisture-laden air; and a flow channel in said panel body of each of said condensation panels that defines a flow path through said panel body between an inlet and an outlet of each of said condensation panels, each of said inlets connected to a source of cooled fluid, each of said flow channels being sized and configured to allow a cooled fluid from the source of cooled fluid to flow through said flow channel from said inlet to said outlet of said condensation panel, each of said outlets connected to the source of cooled fluid to direct the cooled fluid thereto, wherein said flow path through each of said condensation panels is selected so the cooled fluid will cool each of said condensation surfaces of said condensation panels when the cooled fluid is flowing through said flow channel thereof to produce condensate on each of said condensation surfaces when said condensation surfaces are in contact with the moisture-laden air, each of said condensation panels configured for the condensate to flow downward to said lower end of said condensation panel and toward said lower end of said apparatus to collect as the fresh water on a water collecting surface that is associated with said apparatus.

7. The apparatus of claim 6, wherein said panel support mechanism comprises a plurality of panel support members, each of said plurality of panel support members being structured and arranged to position each of said condensation panels in said frame in corresponding relation to said frame with said upper end of each of said condensation panels directed toward said upper end of said apparatus and said lower end of each of said condensation panels directed toward said lower end of said apparatus.

8. The apparatus of claim 7, wherein each of said one or more panel support members comprise a support post connected to said frame, said support post cooperatively sized and configured with a support aperture in said panel body of said condensation panel so as to allow said support post to pass through said support aperture and support said condensation panel in said frame.

9. The apparatus of claim 8, wherein said support aperture is positioned in a support tab that is attached to or integral with said upper end of said panel body so as to suspend said panel body downward from said support post.

10. The apparatus of claim 6, wherein said condensation surfaces of each of said condensation panels have a shaped surface, said shaped surfaces configured to increase said surface area of said condensation surfaces so as to increase the condensate on said condensation surface and the fresh water produced thereby.

11. An atmospheric water generating system for producing fresh water, said system comprising:
a moisture-laden air having water vapor associated therewith;
a plurality of water generating apparatuses, each of said apparatuses having a frame with a plurality of frame members that define an upper end and a lower end of said apparatus, at least one panel support mechanism associated with said frame, a plurality of condensation panels that are supported by said panel support mechanism on or in said frame, each of said condensation panels having a panel body, a condensation surface associated with each of a first side and a second side of said panel body, a surface area of each of said condensation surfaces that will contact said moisture-laden air when said condensation panel is exposed to said moisture-laden air, and a flow channel in said panel body of each of said condensation panels that defines a flow path through said panel body between an inlet and an outlet of said condensation panel;
a source of cooled fluid that produces a cooled fluid, said inlets of each of said condensation panels of each of said plurality of apparatuses being connected to said source of cooled fluid so as to receive said cooled fluid in said flow channels of said condensation panels;
one or more pumps interconnecting said source of cooled fluid and each of said condensation panels so as to pressurize said cooled fluid and direct said cooled fluid to and through said flow channels of said condensation panels from said inlet to said outlet thereof, said outlets of each of said condensation panels connected to the source of cooled fluid to direct the cooled fluid thereto so as to define a closed-loop cooling system;
one or more fans configured to direct said moisture-laden air to and around each of said apparatuses and to direct dried air away from each of said apparatuses;
a source of power connected to at least one of said source of cooled fluid, said one or more pumps and said one or more fans;
a water collecting surface associated with each of said apparatuses to collect the fresh water from said apparatuses; and
at least one collection area, said at least one collection area in fluid flow connection with said water collecting surface so as to receive the fresh water from said water collecting surface,
wherein said flow path through each of said condensation panels is selected so said cooled fluid from said source of cooled fluid will cool each of said condensation surfaces of each of said condensation panels when said cooled fluid is flowing through said flow channel thereof to produce condensate on each of said condensation surfaces of each of said condensation panels when each of said condensation surfaces are in contact with said moisture-laden air, each of said condensation panels configured for the condensate to flow downward to a lower end of each of said condensation panels and toward said lower end of each of said apparatuses to collect as fresh water on said water collecting surface.

12. The system of claim 11, wherein said panel support mechanism of each of said apparatuses comprises a plurality of panel support members, each of said plurality of panel support members being structured and arranged to position each of said condensation panels in said frame in corresponding relation to said frame with an upper end of each of said condensation panels directed toward said upper end of said apparatus and said lower end of each of said condensation panels directed toward said lower end of said apparatus.

13. The system of claim 12, wherein each of said one or more panel support members comprise a support post connected to said frame, said support post cooperatively sized and configured with a support aperture in said panel body of said condensation panel so as to allow said support post to pass through said support aperture and support said condensation panel in said frame.

14. The system of claim 11, wherein said condensation surfaces of each of said condensation panels have a shaped surface, said shaped surfaces configured to increase said surface area of said condensation surfaces so as to increase the condensate on said condensation surface and the fresh water produced thereby.

15. The system of claim 11, wherein each of said apparatuses are disposed in a building having a floor.

16. The system of claim 11, wherein source of cooled fluid comprises one or more chilling mechanisms.

* * * * *